(12) United States Patent
Doehla et al.

(10) Patent No.: US 7,648,563 B2
(45) Date of Patent: Jan. 19, 2010

(54) METHODS AND APPARATUS FOR MANUFACTURING AND ASSEMBLING A BAGHOUSE BAG FILTER TENSIONING ASSEMBLY

(75) Inventors: James Roy Doehla, Pleasant Hill, MO (US); John V. Pepka, Kokomo, IN (US)

(73) Assignee: General Electric Company, Schenectady, NY (US)

( * ) Notice: Subject to any disclaimer, the term of this patent is extended or adjusted under 35 U.S.C. 154(b) by 171 days.

(21) Appl. No.: 11/255,832

(22) Filed: Oct. 21, 2005

(65) Prior Publication Data

US 2007/0089607 A1    Apr. 26, 2007

(51) Int. Cl.
*B01D 46/00* (2006.01)
*F16F 1/06* (2006.01)
(52) U.S. Cl. .................. 95/273; 55/378; 267/166
(58) Field of Classification Search ........... 267/166; 55/378; 95/273
See application file for complete search history.

(56) References Cited

U.S. PATENT DOCUMENTS

| | | | |
|---|---|---|---|
| 485,652 A * | 11/1892 | Pfingst .................. 267/166 |
| 2,991,064 A * | 7/1961 | De Jean ................ 267/167 |
| 3,034,869 A * | 5/1962 | Peterson ............... 422/311 |
| 3,323,785 A * | 6/1967 | Mather ................ 267/167 |
| 3,881,673 A | 5/1975 | Peterson |
| 4,217,117 A | 8/1980 | Syverson |
| 4,231,770 A * | 11/1980 | Johnson, Jr. ............ 55/302 |
| 4,364,758 A | 12/1982 | Clements et al. |
| 4,377,280 A * | 3/1983 | Wienand et al. ........ 267/180 |
| 4,389,228 A | 6/1983 | Leunig |
| 4,396,408 A | 8/1983 | Mace |
| 4,400,186 A | 8/1983 | Leunig et al. |
| 4,472,183 A | 9/1984 | Mace |
| 4,595,402 A | 6/1986 | Silletto et al. |
| 4,597,783 A | 7/1986 | Brennecke et al. |
| 4,671,812 A * | 6/1987 | Brennecke et al. ....... 55/378 |
| 4,813,985 A | 3/1989 | Brennecke et al. |
| 4,867,771 A | 9/1989 | Brennecke et al. |
| 5,310,167 A * | 5/1994 | Noll, Jr. ................ 267/33 |

\* cited by examiner

*Primary Examiner*—Walter D Griffin
*Assistant Examiner*—Amber Orlando
(74) *Attorney, Agent, or Firm*—Armstrong Teasdale LLP

(57) ABSTRACT

A method of assembling a baghouse bag filter tensioning assembly is provided. The assembly includes a compressible spring having a progressively increasing spring rate. The spring rate facilitates induction of a substantially constant spring tension over a range of pre-determined operating conditions. The method includes coupling the spring to a bag filter support frame and a bag filter. The method also includes compressing the spring into a pretensioned condition. The method further includes coupling a bag filter to a baghouse floor. The method also includes decompressing the spring such that a tension induced in the bag filter is substantially similar to the spring tension induced over a range of pre-determined operating conditions.

15 Claims, 6 Drawing Sheets

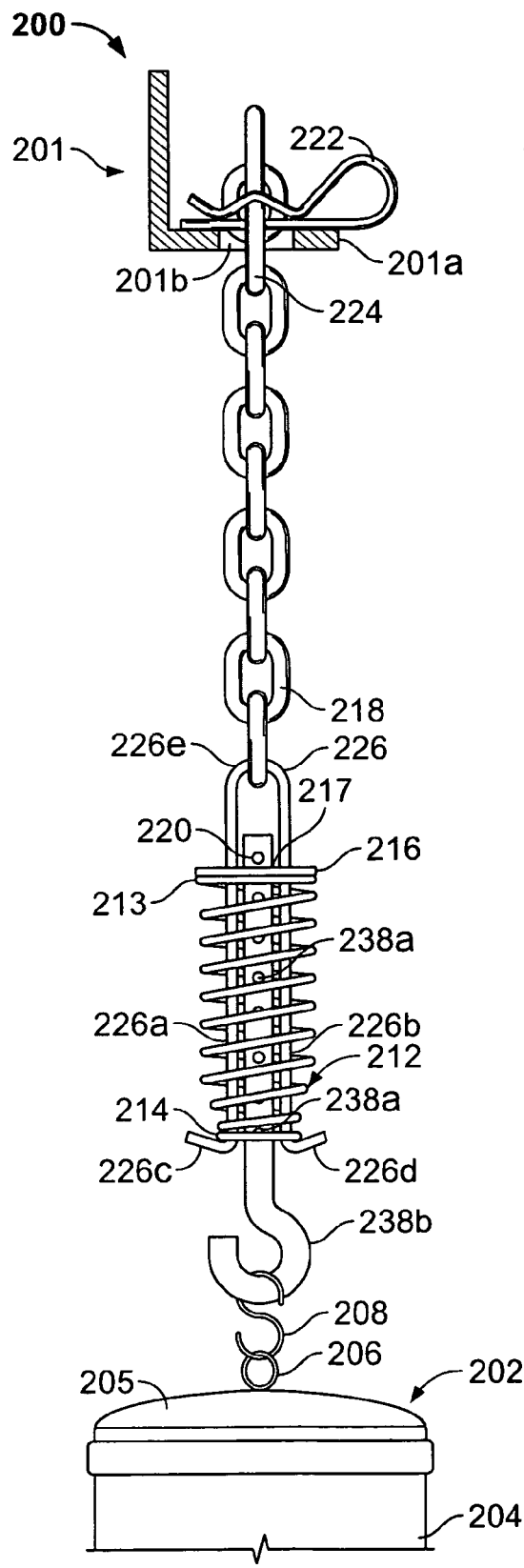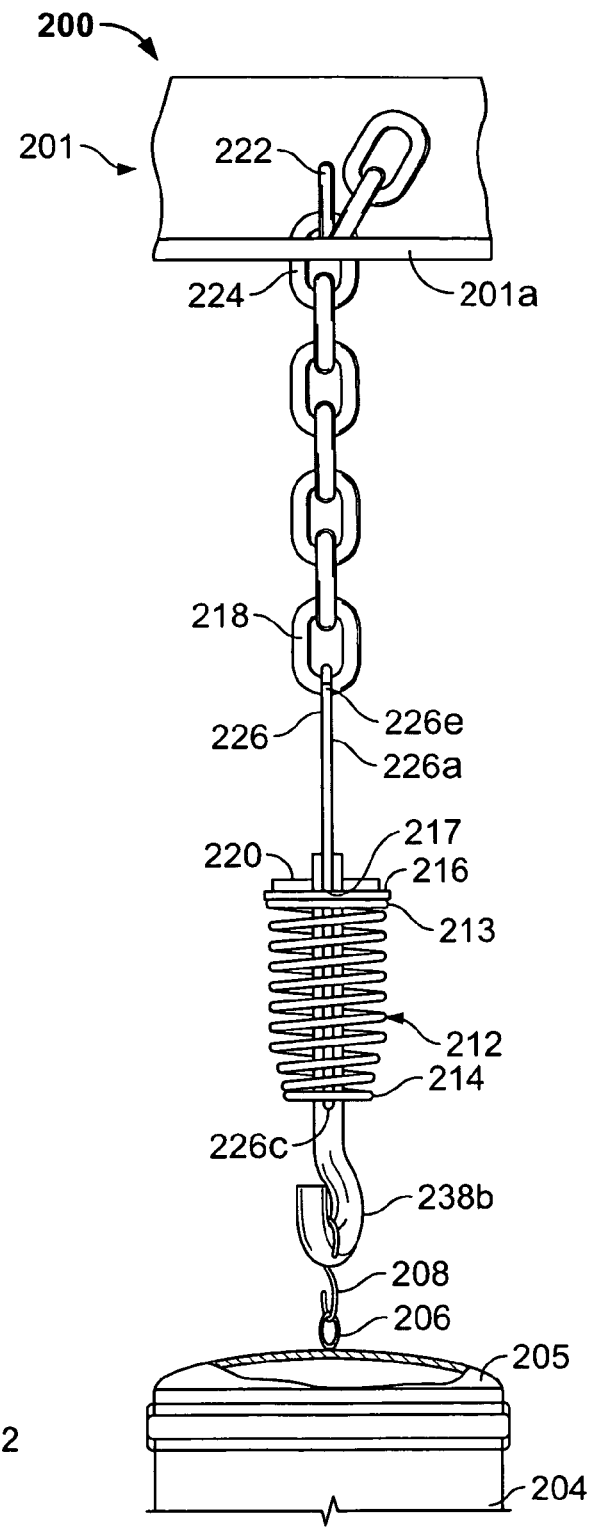
FIG. 4
FIG. 5

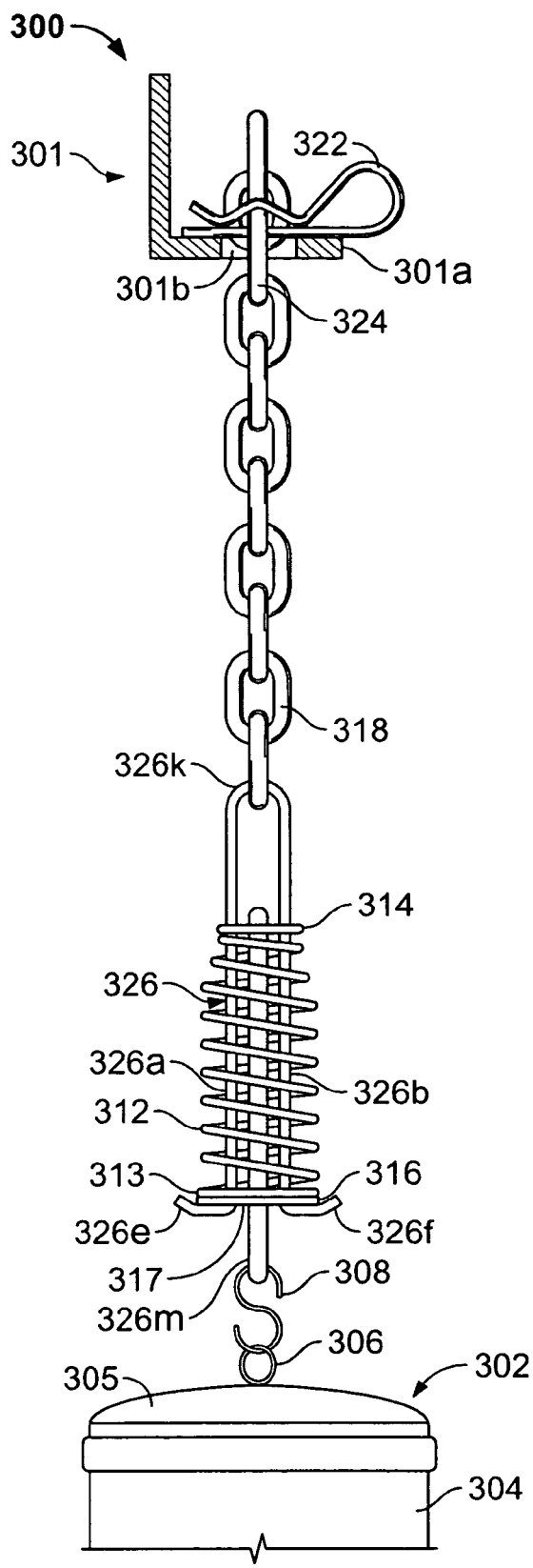
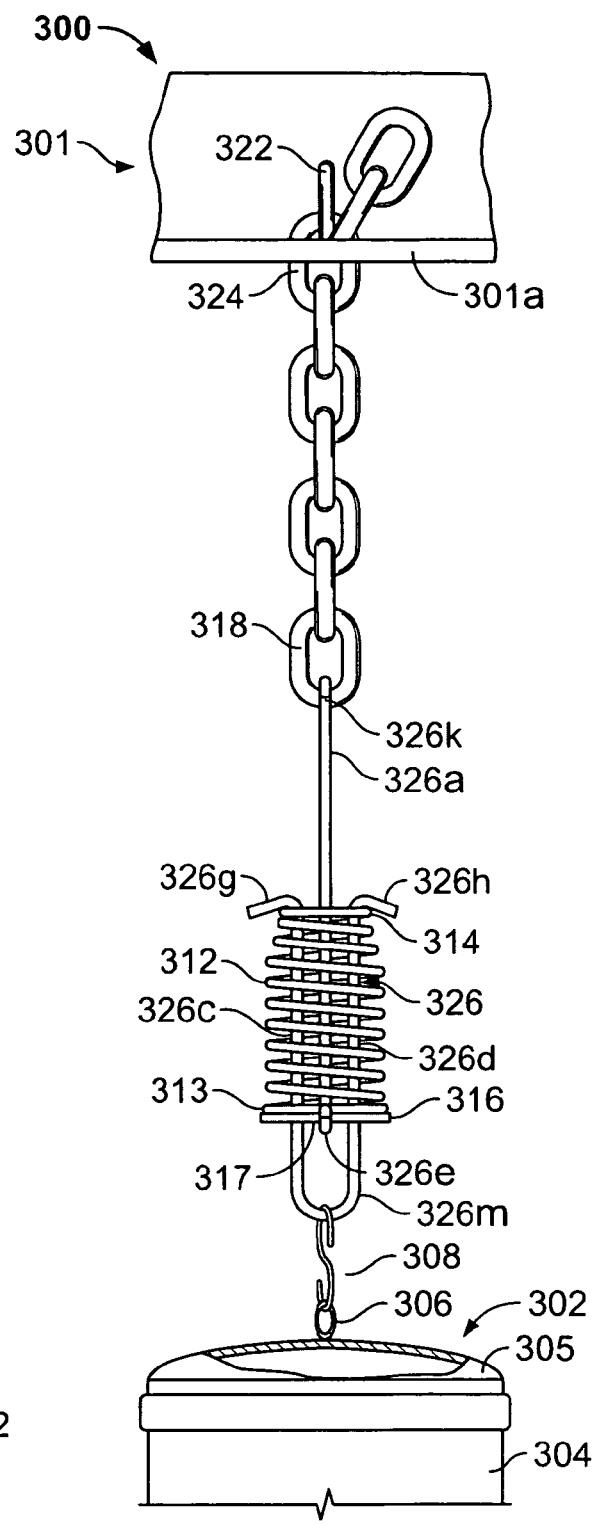
FIG. 6
FIG. 7

METHODS AND APPARATUS FOR MANUFACTURING AND ASSEMBLING A BAGHOUSE BAG FILTER TENSIONING ASSEMBLY

BACKGROUND OF THE INVENTION

This invention relates generally to industrial baghouses and, more particularly, to a tensioning assembly for connecting bag filters to an overhead support.

Industrial and regulatory emphasis on environmental air quality may tend to increase efforts to develop techniques to improve effectiveness and efficiencies of methods and apparatus for separating and removing particulate matter from a fluid flow stream. At least one known technique for particulate removal is fabric filtration. Some known fabric filtration methods include the use of a baghouse and an associated bag filtration system employing bag filters. One fundamental scheme of operation of a bag filtration system is that a fluid that contains entrained particulate matter enters the interior section of a porous bag filter. The fluid transports through the bag filter fabric and exits the external surface of the bag filter. The particulates, depending on their size and chemical constituents, are captured on the interior surface of the bag filter and accumulate on that surface. This mode of operation is referred to as the filtration mode.

During extended operation of a bag filtration system in the filtration mode, particulates accumulate on an interior surface of the filter such that "caking" of the particulates occurs on the bag filter interior surface, thereby tending to reduce the efficiency of fluid flow through the bag filter fabric. Eventually a cleaning process is employed to remove the caked particulate. Some known processes of bag filter cleaning include manual methods that include removing the filtering system from service, often referred to as executing a system outage, and employing manual labor. Removing the system from service and employing manual labor tends to facilitate an increase in the expense of operating and maintaining the filtering system.

Some known alternate cleaning processes include remote bag filter cleaning and the employment of this process referred to as a cleaning mode of operation. Some of these known remote processes include a reverse flow-type bag filter cleaning sub-system. A reverse fluid flow process may include interrupting the flow of fluid from the interior of the bag filter to the external surface via the porous fabric and subsequently inducing a reverse fluid flow from the external bag filter surface to the interior surface through the filter fabric. The reverse fluid flow may contain sufficient force to dislodge the caked particulate matter from the bag filter interior wall. The process may be considered remote in that it may be initiated and controlled from a location external to the bag house and may eliminate some manual cleaning efforts. The process may also be automated.

Some known reverse flow cleaning processes may tend to induce sufficient force to collapse bag filters inward. This condition tends to reduce the effectiveness of the cleaning operation by at least partially collapsing bag filters such that dislodging the caked particulate matter is partially prevented. Increased tensioning of the bag filters improves resistance against the tendency to collapse. However, if the bag filters are stretched too tightly, the extended tension tends to induce a weakening of the fabric structure and the bag filters may wear more quickly. Also, cycling between filtering mode and cleaning mode induces varying tensions in the fabric and may cause the fabric to stretch. Varying tensions in the filter bags outside of pre-determined tolerances may increase the number of system outages, manual inspections and subsequent manual re-tensioning of the bag filters. If left unattended, the stretching of the fabric may eventually result in a failure of the bag filter. Alternately, if the tension of the bag filters is such that the bag filters are too loose, the bag filters tend to bend or flex such that they rub against one another or against other system components, resulting in bag filter abrasion and possible failure as well as negatively impact cleaning efforts as described above.

Some known baghouse filtering systems use a bag filter tensioning assembly that includes a spring to attempt to induce a substantially constant tension in the bag filters. However, some of these known spring tensioning assemblies employ springs that induce sufficient tension in the bag filters during filtration operations, yet may not compress readily and thereby may not increase tension sufficiently during cleaning operations to substantially resist the tendency of bag filter collapse. Also, some known spring tensioning assemblies induce sufficient tension to resist bag filter collapse during cleaning operations, yet may also induce excessive tension during filtration mode operations.

BRIEF DESCRIPTION OF THE INVENTION

In one aspect, a method of assembling a baghouse bag filter tensioning assembly is provided. The assembly includes a compressible spring having a progressively increasing spring rate. The spring rate facilitates induction of a substantially constant spring tension over a range of pre-determined operating conditions. The method includes coupling the spring to a bag filter support frame and a bag filter. The method also includes compressing the spring into a pretensioned condition. The method further includes coupling a bag filter to a baghouse floor. The method also includes decompressing the spring such that a tension induced in the bag filter is substantially similar to the spring tension induced over a range of pre-determined operating conditions.

In another aspect, a compressible spring is provided. The spring includes a plurality of portions that include at least one straight spring portion and at least one conical spring portion. The at least one straight spring portion and the at least one conical spring portion are contiguously formed as a continuous member. The spring includes a progressively increasing spring rate. The spring rate facilitates induction of a substantially constant spring tension within the spring over a range of pre-determined operating conditions. The spring also includes a first open end that includes a first diameter formed at a straight spring portion longitudinal outermost region and a second open end that includes a second diameter formed at a conical spring portion longitudinal outermost region. The first diameter is larger than the second diameter.

In a further aspect, a baghouse filter system is provided. The system includes a bag filter support frame including a structural support member wherein the member includes at least one bag filter support frame open passage. The system also includes at least one bag filter assembly including a bag filter upper mechanical coupling device, a bag filter lower mechanical coupling device, an external surface, and an interior cavity that includes a fibrous material collection surface. The collection surface collects materials with a plurality of pre-determined dimensions entrained in a fluid. The system further includes a bag filter tensioning assembly including at least one compressible spring and a plurality of coupling devices. The spring is coupled to the bag filter via at least one coupling device. The spring has a plurality of portions that include a straight spring portion and a conical spring portion. The straight spring portion and conical spring portion are contiguously formed as a continuous member with a progressively increasing spring rate. The spring rate facilitates induction of a substantially constant spring tension over a range of pre-determined operating conditions. The spring tension is subsequently induced in the bag filter. The system also includes a plurality of chambers including an inlet plenum, an outlet plenum and a material collection hopper. The system further includes a baghouse floor including at least one bag house floor open passage and at least one bag filter-to-baghouse floor coupling device. The system also includes a reverse fluid flow sub-system.

BRIEF DESCRIPTION OF THE DRAWINGS

FIG. 4 is a fragmentary schematic illustration of an exemplary baghouse bag filter tensioning system in a relaxed condition that may be used with the system in FIG. 1;

FIG. 5 is a fragmentary schematic illustration of the exemplary baghouse bag filter tensioning system in a completely installed condition that may be used with the system in FIG. 1;

FIG. 6 is a fragmentary schematic illustration of an alternate embodiment of a baghouse bag filter tensioning system in a relaxed condition that may be used with the system in FIG. 1;

FIG. 7 is a fragmentary schematic illustration of the alternate embodiment of a baghouse bag filter tensioning system in a completely installed condition that may be used with the system in FIG. 1;

DETAILED DESCRIPTION OF THE INVENTION

Figure 1:
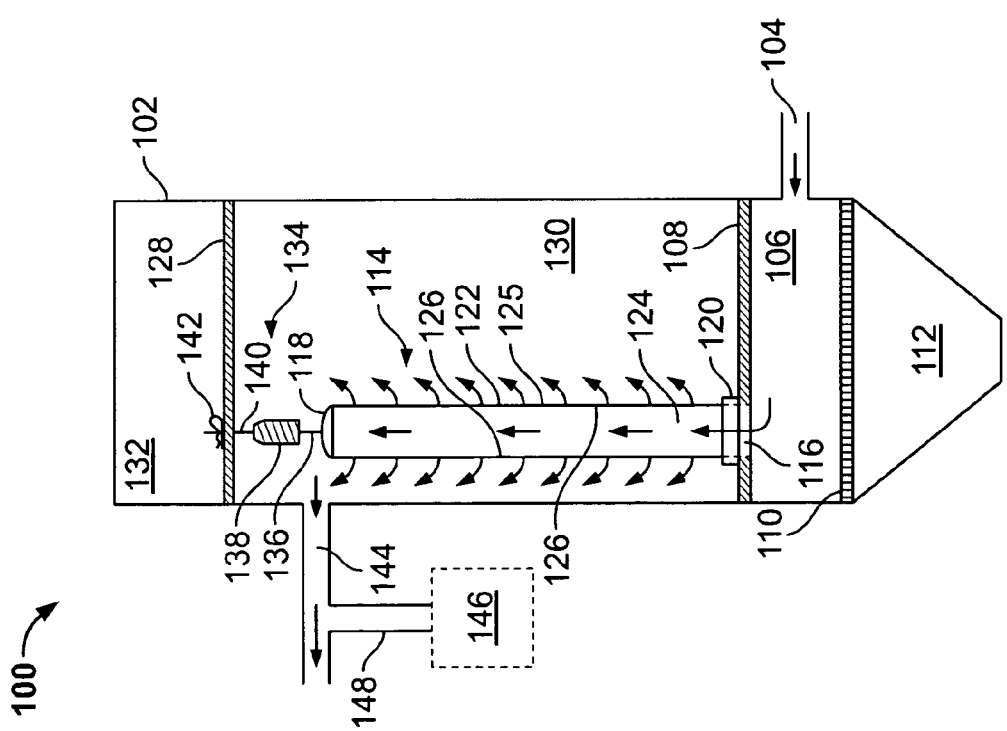
FIG. 1 is a schematic illustration of an exemplary baghouse filter system in a filtration mode of operation.

FIG. 1 is a schematic illustration of an exemplary baghouse filter system 100 in a filtration mode of operation. Flows associated with the fluid flow stream are illustrated by arrows. System 100 includes an enclosure 102, a fluid inlet duct 104, a fluid inlet plenum 106, a baghouse floor 108, a hopper grating 110, a particulate hopper 112, and at least one bag filter assembly 114. Bag filter assembly 114 includes an upper mechanical coupling 118 and a lower mechanical coupling 120. Assembly 114 also includes an elongated fabric filter tube 125 that further includes an external surface region 122, and an interior cavity 124 that includes an interior collection surface 126. System 100 also includes a bag filter support frame 128 that, in conjunction with floor 108 and a portion of enclosure 102, forms outlet plenum 130. Support frame 128 and a portion of enclosure 102 form upper access chamber 132. System 100 further includes a bag filter tensioning assembly 134 that further includes a bag filter-to-spring coupling device 136, a hybrid compressible spring 138, a spring-to-support frame coupling device 140, and a tensioning assembly coupling device 142 that couples assembly 134 to bag filter support frame 128. System 100 also includes a fluid outlet duct 144, a reverse fluid flow sub-system 146 and a reverse fluid flow supply duct 148.

In the exemplary embodiment system 100 removes entrained particulate matter from a fluid stream wherein the fluid is a gas or a plurality of gases, for example, combustion gases, with entrained fly ash. The motive forces for transporting the fluid may be induced via a fan sub-system or pumping sub-system (neither shown in FIG. 1). The origin of the fluid may be a furnace or an alternate combustion system (neither shown in FIG. 1). Enclosure 102 provides external support, protection and containment of many of the components of filtering system 100 as discussed below. In the exemplary embodiment enclosure 102 is a stand-alone structure. Alternatively, enclosure 102 may be a component of a larger structure, for example, a building. Particulate-laden gases are introduced to system 100 via fluid inlet duct 104. Fluid is transported from inlet duct 104 into fluid inlet plenum 106, wherein inlet plenum 106 is a chamber formed by a portion of enclosure 102, baghouse floor 108, and hopper grating 110. Hopper grating 110 extends over particulate hopper 112 and facilitates personal access into inlet plenum 106 and prevents objects larger than the openings in grating 110 to pass through into hopper 112. Hopper 112 collects particulate matter that has fallen from bag filter 114 or is removed from the fluid stream due to the sudden change in direction of fluid in plenum 106 from a substantially horizontal direction in duct 104 to a substantially vertical direction in bag filter 114 as illustrated by the arrows in FIG. 1. Particulate material removal from hopper 112 may be facilitated via a manual opening (not shown in FIG. 1) at the bottom of hopper 112 that may be operated to use gravity flow to empty hopper 112. Alternatively, more complex particulate removal systems, such as a vacuum sub-system (not shown in FIG. 1), may be used.

Fluid is distributed to bag filter assembly 114 via open passage 116 in baghouse floor 108. In the exemplary embodiment a plurality of bag filter assemblies 114 may be used. However, for clarity, only one bag filter assembly 114 is illustrated in FIG. 1. Assembly 114 is suspended via upper mechanical coupling 118, discussed in more detail below. Assembly 114 is coupled to floor 108 via lower mechanical coupling 120. In the exemplary embodiment, coupling 120 includes a column-like upward floor protrusion (sometimes referred to as a thimble) (not shown in FIG. 1). The bottom of bag filter assembly 114 slips over the thimble and is secured to the thimble via a clamping device similar in nature to a radiator hose clamp (not shown in FIG. 1). Alternate embodiments for coupling 120 may include a strap or a removable collar that is coupled to floor 108. Bag filter assembly 114 is secured such that the lower portion of cavity 124 is in flow communication with inlet plenum 106 via open passage 116.

Bag assembly 114 is supported from above via tensioning assembly 134. Coupling device 142 is positioned in upper access cavity 132 and couples coupling 140 to frame 128 such that frame 128 supports substantially most of the weight associated with tensioning assembly 134 and bag filter assembly 114. Coupling 140 is further coupled to spring 138. Spring 138 is coupled to bag filter assembly via coupling 136 that is coupled to coupling device 118. Tensioning assembly 134 is shown to be substantially enclosed within outlet plenum 130. One alternate embodiment may be assembly 134 substantially enclosed within access chamber 132. Further details of assembly 134 are discussed below.

Particulate-laden fluid flows upward within interior cavity 124 and a substantial majority of fluid may flow through substantially cylindrical, porous, fibrous fabric tube 125 into outlet plenum 130. Tube 125 may be manufactured of fibrous materials, for example, polytetrafluoroethylene (PTFE), nylon, acrylic, and fiberglass or a combination thereof. Alternatively, tube 125 may also include a plurality of rigid rings installed circumferentially at pre-determined intervals along the length of tube 125 (not shown in FIG. 1). These rings (sometimes referred to as anti-collapse rings) may tend to induce additional support to facilitate maintenance of the substantially cylindrical shape of tube 125 throughout a pre-determined range of operations. A substantial majority of entrained particulates may be collected on interior surface 126.

In the exemplary embodiment, during filtration mode operations, spring 138 induces sufficient tension within tube 125 to maintain the substantially cylindrical shape of tube 125 as particulate matter collects on interior surface 126 without inducing excessive tension that may weaken the fabric. Fluid, that may be substantially free of particulate matter, enters outlet duct 144 from outlet plenum 130 and exits baghouse filter system 100. Reverse fluid flow sub-system 146 and reverse fluid flow supply duct 148 are discussed below.

Figure 2:
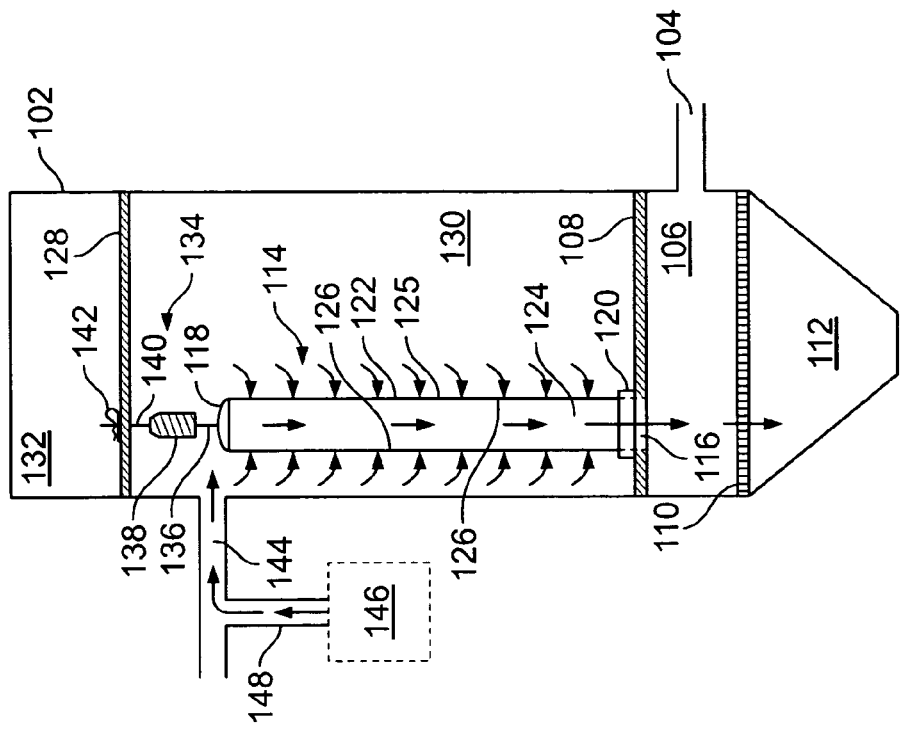
FIG. 2 is a schematic illustration of the exemplary baghouse filter system in FIG. 1 in a reverse flow cleaning mode of operation.

FIG. 2 is a schematic illustration of exemplary baghouse filter system 100 in a reverse flow cleaning mode of operation. The arrows illustrate the direction of fluid flow. Reverse fluid flow sub-system 146 supplies fluid flow in a reverse direction of the filtering flow mode such that caked particulate matter formed on surface 126 may be dislodged. Sub-system 146 may include, but is not limited to, a plurality of pumps or fans, ducting and isolation dampers (all not shown in FIG. 2) that induce and direct fluid flow from sub-system 146 into duct 148. Fluid flows from duct 148 into duct 144 and subsequently into plenum 130. Plenum 130 is pressurized and fluid flow is induced through fabric 125 from exterior surface region 122 to collection surface region 126. The force induced by the reverse fluid flow may dislodge a substantial portion of caked particulate matter that has accumulated on surface 126 during filtration mode operations. The dislodged particulate matter becomes entrained in the reverse fluid flow stream and is carried into inlet plenum 106 through open passage 116. The particulate matter may be transported through grating 110 into hopper 112 for later removal as discussed above. In an alternative embodiment, an apparatus (not shown in FIG. 2) that imparts mechanical vibration into bag filter assembly 114 may be used to shake assembly 114 to further dislodge particulate matter from surface 126.

Reverse fluid flow may tend to induce sufficient force on fabric tube 125 to collapse tube 125 inward. This condition may reduce the effectiveness of the cleaning operation by at least partially collapsing fabric tube 125 such that dislodging some of the caked particulate matter is prevented. In the exemplary embodiment, spring 138 induces sufficient tension in fabric tube 125 such that tube 125 may maintain its substantially cylindrical shape and not collapse during reverse fluid flow mode operations.

Figure 3:
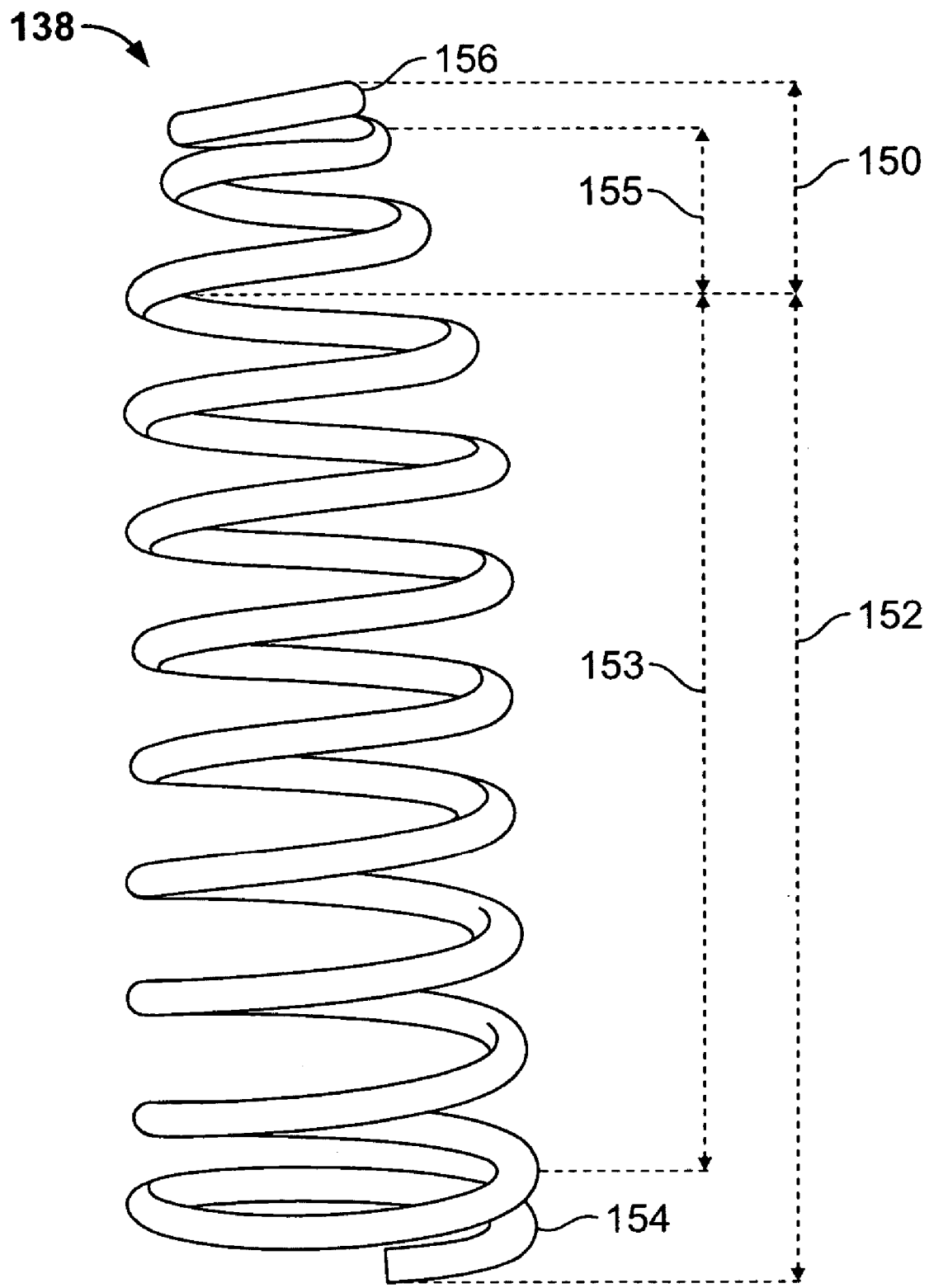
FIG. 3 is a schematic illustration of an exemplary compressible spring that may be used with the system in FIG. 1.

FIG. 3 is a schematic illustration of exemplary compressible spring 138 that may be used with system 100 (shown in FIG. 1). Spring 138 is a hybrid spring that includes a continuous member formed into a plurality of helical coils with two portions, i.e., a conical portion 150 and a straight spring portion 152 that combines the typical benefits of conical and straight springs into one unit.

Spring 138 is a compression spring, i.e., tension induced in spring 138 increases as spring 138 is compressed and spring 138 length is decreased. The purpose of spring 138 is to induce a range of pre-determined tension in fabric tube 125. In the exemplary embodiment, spring 138 may be manufactured from 17-7Ph stainless steel wire with a 0.207-inch gauge thickness. Alternatively, chrome vanadium steel, chrome silicon steel, inconel, monel and titanium are further examples of materials that may be used. Cost and operational characteristics may be the prime determinants for selecting the material for use in spring manufacturing.

Portions 150 and 152 may be differentiated by their associated proportionate lengths, number of coils, coil diameters and spring rates. "Spring rate" may be defined as a spring property that represents the amount of force necessary to compress a spring and is typically represented in kilograms per centimeter (kg/cm) (pounds per inch (lb/in)). Typical straight springs may have a substantially linear spring rate, i.e., a given amount of force will compress a typical straight spring for the entire length of travel. For example, if a typical straight spring has a spring rate of 100 kg/cm, the first 100 kg of force will compress the typical spring 1 cm, the second 100 kg of force will compress the typical spring another 1 cm for 2 cm in total and so on until the full limit of spring travel is induced. Reaching the full limit of travel, i.e., all spring coils are in contact with adjacent coils, may be referred to as "going solid". In general, larger spring coils have a softer, i.e., lower, spring rate than smaller coils which have a stiffer, i.e., higher spring rate. Typical conical springs have a progressively higher spring rate as compared to typical straight springs due to increasingly smaller coils, i.e., a greater amount of force may be needed to compress a typical conical spring throughout the length of spring travel. For example, if a typical conical spring has a spring rate of 100 kg/cm for the first cm of travel, the first 100 kg of force will compress the typical spring 1 cm. If the same typical conical spring has a spring rate of 120 kg/cm throughout the next cm of travel, a second force of 120 kg will compress the same typical spring another 1 cm with a total force of 220 kg and a total compressed distance of 2 cm. Similar subsequent increases in the spring rate for the same typical conical spring may be induced until the full limit of spring travel is induced. Spring rates may be determined by the material used to manufacture a spring, the diameter of the associated coils, and the pitch, i.e., coils per unit length, of the associated coils.

In general, selecting an appropriate spring with the appropriate spring properties may facilitate decreasing the potential for a spring to incur a deflection severe enough to induce a "permanent set", i.e., a permanent distortion of the spring. A permanent set reduces the spring travel distance as it is compressed from an unloaded condition to a solid condition with an associated decrease in the capacity of the spring to accept load.

Straight portion 152 includes a plurality of helical coils with a substantially similar diameter. The exemplary embodiment in FIG. 3 illustrates 7 active coils 153 in portion 152 and one inactive coil 154. Active coils 154 deflect under load while inactive coil 156 does not. Alternative embodiments may include, but not be limited to, the number of coils appropriate for the desired operational use. The associated substantially constant spring rate tends to facilitate maintaining initial fabric tube 125 tension, i.e., pre-load tension, within a pre-determined range throughout a typical range of filtration mode operations for a longer period of time than conical springs, including typical increases in tube 125 length as new tubes 125 stretch during fabric break-in periods. In the absence of conical spring portion 150, to facilitate maintaining the desired tension during reverse fluid flow cleaning mode operations, the associated soft spring rate of straight portion 152 may facilitate an increase in the design length of the associated straight spring to a design spring length that is greater than desired in order to induce the broader range of desired tensions Conical portion 150 better facilitates maintaining the desired range of induced tension during reverse flow mode operations as discussed below.

Conical portion 150 includes a plurality of helical coils with a decreasing diameter as the longitudinal end of conical portion 150 is approached. The exemplary embodiment in FIG. 3 illustrates 2 active coils 155 in portion 150 and one inactive coil 156. Alternative embodiments may include, but not be limited to, the number of coils appropriate for the desired operational use. The progressively increasing spring rate associated with conical portion 150 as portion 150 is compressed facilitates increasing tension in fabric tube 125 within desired ranges during reverse fluid flow mode operations, thereby facilitating a decrease in the design length of straight portion 152. However, in the absence of straight portion 152, the varying spring rate associated with a typical conical spring during filtration mode operations may facilitate more frequent outages to manually adjust the tension in the spring due to spring tension exceeding desired tolerances. Straight portion 152 better facilitates maintaining the desired range of induced tension during filtration mode operations as discussed above.

In the exemplary embodiment, combining the features of straight spring portion 152 with conical spring portion 150 facilitates inducing a progressively increasing spring rate that induces a substantially constant tension into fabric tube 125 during substantially a full range of operational modes. The straight spring portion 152 of hybrid spring 138 facilitates inducing a linear spring rate for a predetermined range of load that extends the point where spring rate increases dramatically with increases in load. The larger helical coils are isolated from high stresses normally associated with larger loads due to the tendency of straight spring portion 152 to assume a solid condition preceding a dramatic increase in load. While straight spring portion 152 is solid, conical section 150 exhibits a rapid increase in spring rate for increases in load which facilitates substantially increasing a load at which spring 138 assumes a completely solid condition.

Conical portion 150 also facilitates dampening vibrations and shock forces, i.e., rapid loading effects, induced to spring 138 to a greater degree than straight spring portion 152. In one embodiment, hybrid spring 138 may facilitate extending an expected spring 138 useful life expectancy to approximately 30 years as compared to approximately 7 years for some known conical spring designs. In another embodiment, spring 138 may facilitate reducing permanent set spring conditions as compared to some known springs. For example, in one embodiment spring 138 exhibits approximately a 2.27 kg (5 pound) set and approximately a 0.277 cm (0.109 inch) set when fully compressed and subjected to a design load of approximately 152 kg (335 pounds). In another embodiment, spring 138 exhibits approximately a 6.35 kg (14 pound) and 0.729 cm (0.287 inch) set when compressed to a solid condition at approximately 194 kg (428 pounds).

FIGS. 4 and 5 are fragmentary schematic illustrations of an exemplary embodiment of a baghouse bag filter tensioning assembly 200 that may be used with system 100 (shown in FIG. 1). FIG. 4 illustrates assembly 200 in a relaxed condition from one horizontal, radial perspective and FIG. 5 illustrates assembly 200 in a completely installed condition from a perspective at a horizontal right angle radially from the perspective of FIG. 4.

Support frame 201, including support frame horizontal member 201a, bag filter assembly 202, fabric filter tube 204, bag filter assembly upper coupling cap 205, including coupling ring 206, and S-hook 208 are illustrated for perspective. Assembly 200 includes hybrid spring 212, including a larger diameter end 213 and a smaller diameter end 214, a retainer washer 216 that includes a central slot 217, a support chain 218, a rolled pin 220, an upper hitch pin clip 222, a support chain link 224, a draw bar 226 that includes two draw bar legs 226a and 226b, two draw bar ears 226c and 226d, and a draw bar bight 226e, an I-bolt 238 that includes a plurality of I-bolt holes 238a and an I-bolt lower hook end 238b.

Assembly 200 is positioned in outlet plenum 130 (shown in FIG. 1) and is mounted to support frame 201 that may be constructed of angle iron members including horizontal member 201a. Member 201a includes open passage 201b that may be used to facilitate coupling bag filter assembly 202 to support frame 201. Bag filter assembly 202 includes fabric filter tube 204 (only the upper portion illustrated) and upper coupling cap 205. Fluid may flow out of tube 204 into outlet plenum 130 during filtration mode operations and from plenum 130 into tube 204 during reverse fluid flow mode operations. Cap 205 includes coupling ring 206. S-hook 208 is used for coupling bag filter assembly 202 to tensioning assembly 200.

An exemplary embodiment of hybrid spring 212 is positioned within assembly 200 such that larger diameter end 213 is closest to support frame 201 and smaller diameter end 214 is closest to bag filter assembly 202. Hybrid spring 212 is substantially similar to spring 138 (shown in FIG. 3). Spring 212 includes a straight portion with seven active coils and one inactive coil (that includes large diameter end 213) as well as a conical portion that includes two active coils and one inactive coil (that includes small diameter end 214). Contacting the larger diameter end 213 is retainer washer 216 that includes central slot 217 that forms a first spring biasing surface. I-bolt 238, including plurality of lateral holes 238a that completely extend therethrough, extends centrally through spring 212. One end of I-bolt 238 passes through retainer washer 216 via central slot 217 Rolled pin 220 is inserted in the vertically uppermost hole 238a of I-bolt 238.

Also extending centrally through spring 212, on the outside of I-bolt 238, is draw bar 226. Draw bar 226 has the form of a U-shaped member having legs 226a and 226b that pass through slot 217 in retainer washer 216 and terminate in outwardly extending ears 226c and 226d that overlie smaller diameter end 214 of spring 212 to provide a second spring biasing surface. In an alternative embodiment a double drawbar assembly may be used as discussed in more detail below.

Support chain 218 extends upwardly from draw bar bight 226e, i.e., the U-shaped bend formed by the two legs 226a and 226b, through opening 201b in support frame 201 where it is secured by hitch pin clip 222 passed through one link 224 of chain 218.

Lower hook end 238b of I-bolt 238 is coupled to coupling ring 206 that is fixed to rigid upper coupling cap 205. Alternatively, a threaded end of I-bolt 238 may penetrate a hole in cap 206 and be secured within cap 206 via a fastener, for example, a nut. Furthermore, alternatively, a threaded end of I-bolt 238 may be coupled to a threaded fitting in cap 205.

Thus I-bolt 238, washer 216, and pin 220 cooperate to provide a bag filter-to-spring support means, thereby interconnecting spring 212 to bag filter assembly 202. Moreover, draw bar 226, chain 218, and pin 222 cooperate to provide a frame-to-spring support means, thereby interconnecting spring 212 to support frame 201.

In the relaxed condition of assembly 200 (shown in FIG. 4), prior to completed installation condition of assembly 200, spring 212 is uncompressed between the first and second spring biasing surfaces provided, respectively, by retainer washer 216 and draw bar ears 226c and 226d.

Installation of assembly 200 is completed by coupling the upper portion of chain 218, positioned above angle iron 201a, to a tensioning mechanism (not shown in FIGS. 4 and 5), temporarily removing pin 222 from chain link 224 and withdrawing chain 218 upward through open passage 201b. Examples of tensioning mechanisms may be, but not be limited to, electric, hydraulic and pneumatic motors coupled to a cable. Spring 212 compresses against retainer washer 216 and draw bar ears 226c and 226d to induce a force in spring 212 that tends to attempt to spread the first and second spring biasing surfaces apart from each other and, thus, to induce tension in fabric filter tube 204. A predetermined tension in tube 204 may be attained based on the distance of compression of spring 212. Upon attaining the predetermined spring height dimension, pin 222 may be reinserted through a link 224 of support chain 218.

Alternate embodiments for tensioning assembly 200 includes, but is not limited to, using a support rod with a threaded upper end in place of chain 218, extending the support rod threaded upper end into support frame 201 via open passage 201b, and fastening the threaded upper end of the support rod to support frame 201 by a nut instead of pin 222. In this alternative embodiment, spring 212 tension may be adjusted by adjusting the length of the support rod that is above angle iron 201.

FIGS. 6 and 7 are fragmentary schematic illustrations of an alternate embodiment of a baghouse bag filter tensioning assembly 300 that may be used with system 100 (shown in FIG. 1). FIG. 6 illustrates assembly 300 in a relaxed condition from one radial perspective and FIG. 7 illustrates assembly 300 in a completely installed condition from a perspective at a right angle radially from the perspective of FIG. 6.

Support frame 301, including support frame horizontal member 301a, bag filter assembly 302, fabric filter tube 304, and bag filter assembly upper coupling cap 305, including coupling ring 306, and S-hook 308 are illustrated for perspective. Assembly 300 includes hybrid spring 312, including a larger diameter end 313 and a smaller diameter end 314, a retainer washer 316 that includes a central slot 317, a support chain 318, an upper hitch pin clip 322, a support chain link 324, a double draw bar 326 that includes four draw bar legs 326a, 326b, 326c, and 326d, four draw bar ears 326e, 326f, 326g, and 326h, and two draw bar bights 326k and 326m. Assembly 300 is substantially similar to assembly 200 (shown in FIGS. 4 and 5) with one of the exceptions being that the vertical longitudinal orientation of hybrid spring 312 is reversed as compared to spring 212 (shown in FIGS. 4 and 5) as described in more detail below. A second exception is that a double draw bar 326 is used in place of draw bar 226 (shown in FIGS. 4 and 5). A third exception is that draw bar ears 326e and 326f are extended in length as compared to draw bar ears 226c and 226d (both shown in FIG. 5) to accept spring larger diameter end 313.

Assembly 300 is positioned in outlet plenum 130 (shown in FIG. 1) and is mounted to support frame 301 that may be constructed of angle iron members including horizontal member 301a. Member 301a includes open passage 301b that may be used for coupling bag filter assembly 302 to support frame 301. Bag filter assembly 302 includes fabric filter tube 304 (only the upper portion illustrated) and upper coupling cap 305. Fluid may flow out of tube 304 into outlet plenum 130 during filtration mode operations and from plenum 130 into tube 304 during reverse fluid flow mode operations. Cap 305 includes ring coupling 306. S-hook 308 is used for coupling bag filter assembly 302 to tensioning assembly 300.

Hybrid spring 312 is positioned within assembly 300 such that larger diameter end 313 is closest to bag filter assembly 302 and smaller diameter end 314 is closest to support frame 301. Hybrid spring 312 is substantially similar to spring 138 (shown in FIG. 3). Spring 312 includes a straight portion with seven active coils and one inactive coil (that includes large diameter end 313) as well as a conical portion that includes two active coils and one inactive coil (that includes small diameter end 314). Contacting spring larger diameter end 313 is retainer washer 316 that includes central slot 317 that forms a first spring biasing surface.

Extending centrally through spring 312 is double draw bar 326. Double draw bar 326 includes two independent draw bars, both similar to draw bar 226, each having the form of a U-shaped member, having legs 326a, 326b. 326c, and 326d that pass through slot 317 in retainer washer 316 and terminate in outwardly extending ears 326e, 326f, 326g, and 326h. Arms 326e and 326f overlie larger diameter end 313 of spring 312 to provide a first spring biasing surface in conjunction with retainer washer 316. Arms 326g and 326h overlie larger smaller end 314 of spring 312 to provide a second spring biasing surface. Support chain 318 extends upwardly from draw bar bight 326k, i.e., the U-shaped bend formed by the two legs 326a and 326b, through opening 301b in support frame 301 where it is secured by hitch pin clip 322 passed through one link 324 of chain 318.

To couple filter bag assembly 302 to tensioning assembly 300, S-hook 308 is received by bight 326m of double draw bar 326, and coupling ring 306 that is fixed to rigid upper coupling cap 305.

Thus S-hook 308, ring 306 and draw bar 326 cooperate to provide a bag filter-to-spring support means interconnecting spring 312 to bag filter assembly 302. Moreover, draw bar 326, chain 318, washer 316 and pin 322 cooperate to provide a frame-to-spring support means interconnecting spring 312 to support frame 301.

In the relaxed condition of assembly 300 (shown in FIG. 6), prior to completed installation of assembly 300, spring 312 is uncompressed between the first and second spring biasing surfaces provided, respectively, by retainer washer 316 and draw bar ears 326g and 326h.

Installation of assembly 300 is completed by coupling the upper portion of chain 318, positioned above angle iron 301a, to a tensioning mechanism (not shown in FIGS. 6 and 7), temporarily removing pin 322 from chain link 324 and withdrawing chain 318 upward through open passage 301b. Examples of tensioning mechanisms may be, but not be limited to, electric, hydraulic and pneumatic motors coupled to a cable. Spring 312 compresses against retainer washer 316 and draw bar ears 326g and 326h to induce a force in spring 312 that tends to attempt to spread the first and second spring biasing surfaces apart from each other and, thus, to induce tension in fabric filter tube 304. A predetermined tension in tube 304 may be attained based on the distance of compression of spring 312. Upon attaining the predetermined spring height dimension, pin 322 may be reinserted through a link 324 of support chain 318.

Alternate embodiments for tensioning assembly 300 includes, but is not limited to, using a single draw rod assembly, similar to that illustrated in FIGS. 4 and 5, using a support rod with a threaded upper end in place of chain 318, extending the support rod threaded upper end into support frame 301 via open passage 301b, and fastening the threaded upper end of the support rod to support frame 301 by a nut instead of pin 322. In this alternative embodiment, spring 312 tension may be adjusted by adjusting the length of the support rod that is above angle iron 301.

Figure 8:
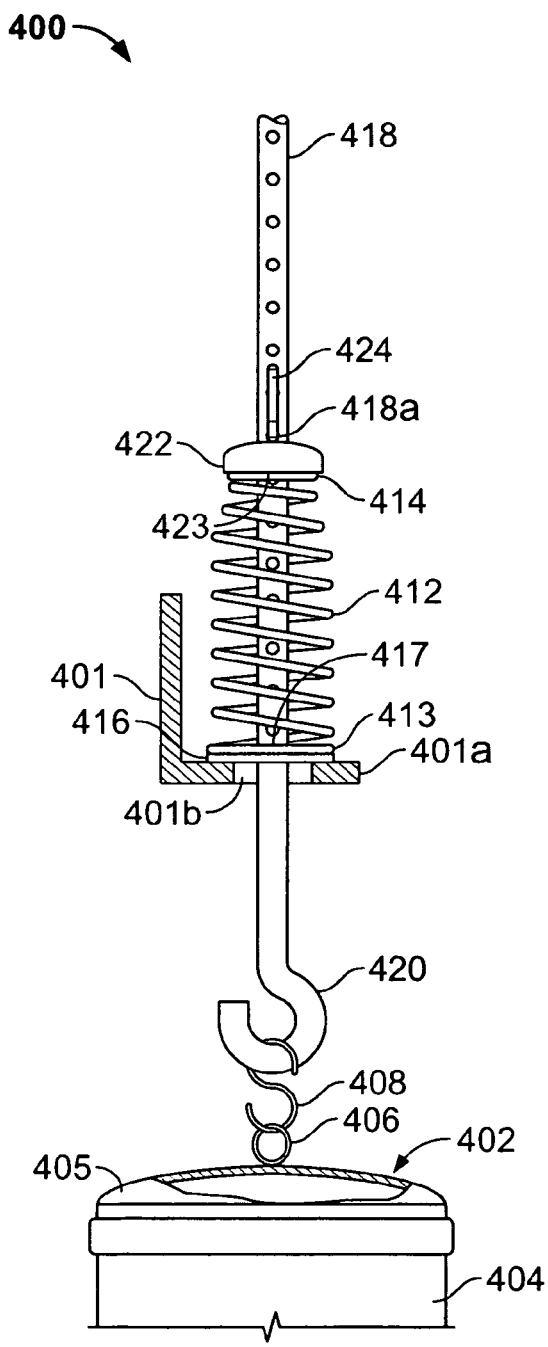
FIG. 8 is a fragmentary schematic illustration of an alternate embodiment of a baghouse bag filter tensioning system in a relaxed condition that may be used with the system in FIG. 1.
Figure 9:
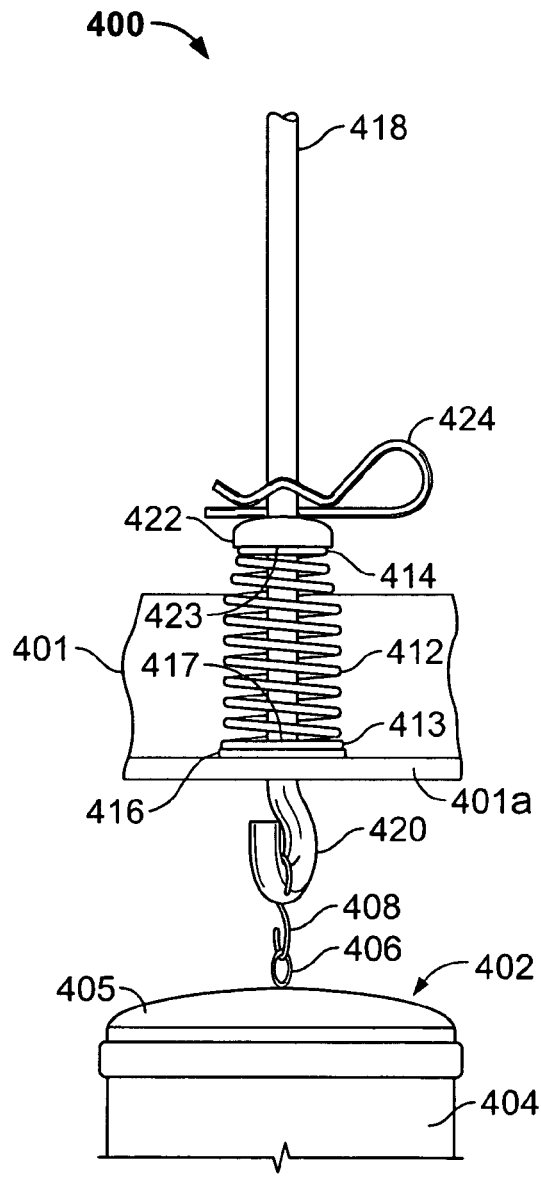
FIG. 9 is a fragmentary schematic illustration of the alternate embodiment of a baghouse bag filter tensioning system in a completely installed condition that may be used with the system in FIG. 1.

FIGS. 8 and 9 are fragmentary schematic illustrations of an alternate embodiment of a baghouse bag filter tensioning assembly 400 that may be used with system 100 (shown in FIG. 1). FIG. 8 illustrates assembly 400 in a relaxed condition from one radial perspective and FIG. 9 illustrates assembly 400 in a completely installed condition from a perspective at a right angle radially from the perspective of FIG. 8.

Support frame 401, including support frame horizontal member 401a, bag filter assembly 402, fabric filter tube 404, and bag filter assembly upper coupling cap 405, including coupling ring 406, and S-hook 408 are illustrated for perspective. Assembly 400 includes hybrid spring 412, including a larger diameter end 413 and a smaller diameter end 414, a cup washer 416 that includes a central slot 417, an I-bolt 418 with a plurality of holes 418a and a lower hook end 420, a guide washer 422 that includes a central slot 423, and a hitch pin clip 424.

Assembly 400 is positioned in outlet plenum 130 and upper access chamber 132 (both shown in FIG. 1) and is mounted to support frame 401 that may be constructed of angle iron members including horizontal member 401a. Member 401a includes open passage 401b that may be used for coupling bag filter assembly 402 to support frame 401. Bag filter assembly 402 includes fabric filter tube 404 (only the upper portion illustrated) and upper coupling cap 405. Fluid may flow out of tube 404 into outlet plenum 130 during filtration mode operations and from plenum 130 into tube 404 during reverse fluid flow mode operations. Cap 405 includes ring coupling 406. S-hook 408 is used for coupling bag filter assembly 402 to tensioning assembly 400.

Hybrid spring 412 is positioned within assembly 400 such that it is positioned within upper access chamber 132. Larger diameter end 413 is closest to bag filter assembly 302 and rests on support frame 401. Smaller diameter end 414 is closest to the top of enclosure 102 (shown in FIG. 1). Hybrid spring 412 is substantially similar to spring 138 (shown in FIG. 3). Spring 412 includes a straight portion with seven active coils and one inactive coil (that includes large diameter end 413) as well as a conical portion that includes two active coils and one inactive coil (that includes small diameter end 414). Contacting spring larger diameter end 413 is cup washer 416 that includes central slot 417 that forms a first spring biasing surface in conjunction with angle iron 401a.

Extending centrally through spring 412 is I-bolt 418. I-bolt 418 is inserted through cup washer central slot 417 and guide washer central slot 423. Pin 424 is inserted in hole 418a of I-bolt 418 to facilitate maintaining assembly 400 in place. The bottom surface of guide washer 422 forms a second spring biasing surface.

To couple filter bag assembly 402 to tensioning assembly 400, S-hook 408 is received by hook 420 of I-bolt 418 and coupling ring 406 fixed to rigid upper coupling cap 405.

Thus S-hook 408, ring 406 and I-bolt 418 cooperate to provide a bag filter-to-spring support means interconnecting spring 412 to bag filter assembly 402. Moreover, I-bolt 418, washer 416, washer 422 and pin 424 cooperate to provide a frame-to-spring support means interconnecting spring 412 to support frame 401.

In the relaxed condition of assembly 400 (shown in FIG. 8), prior to completed installation of assembly 400, spring 412 is uncompressed between the first and second spring biasing surfaces provided, respectively, by cup washer 416 and guide washer 422.

Installation of assembly 400 is completed by coupling a tensioning mechanism (not shown in FIGS. 8 and 9) to the top of guide washer 422, and temporarily removing pin 424 from I-bolt 418. Examples of tensioning mechanisms may be, but not be limited to, hydraulic and pneumatic powered devices having at least one arm or foot that exerts a downward force on the domed top of guide washer 422. The tensioning mechanism induces a downward force on spring 412. Spring 412 compresses against cup washer 416 to induce a force in spring 412 that tends to attempt to spread the first and second spring biasing surfaces apart from each other and, thus, to induce tension in fabric filter tube 404. A predetermined tension in tube 404 may be attained based on the distance of compression of spring 412. Upon attaining the predetermined spring height dimension, pin 424 may be reinserted through hole 418a of I-bolt 418 and the tensioning mechanism removed.

Figure 10:
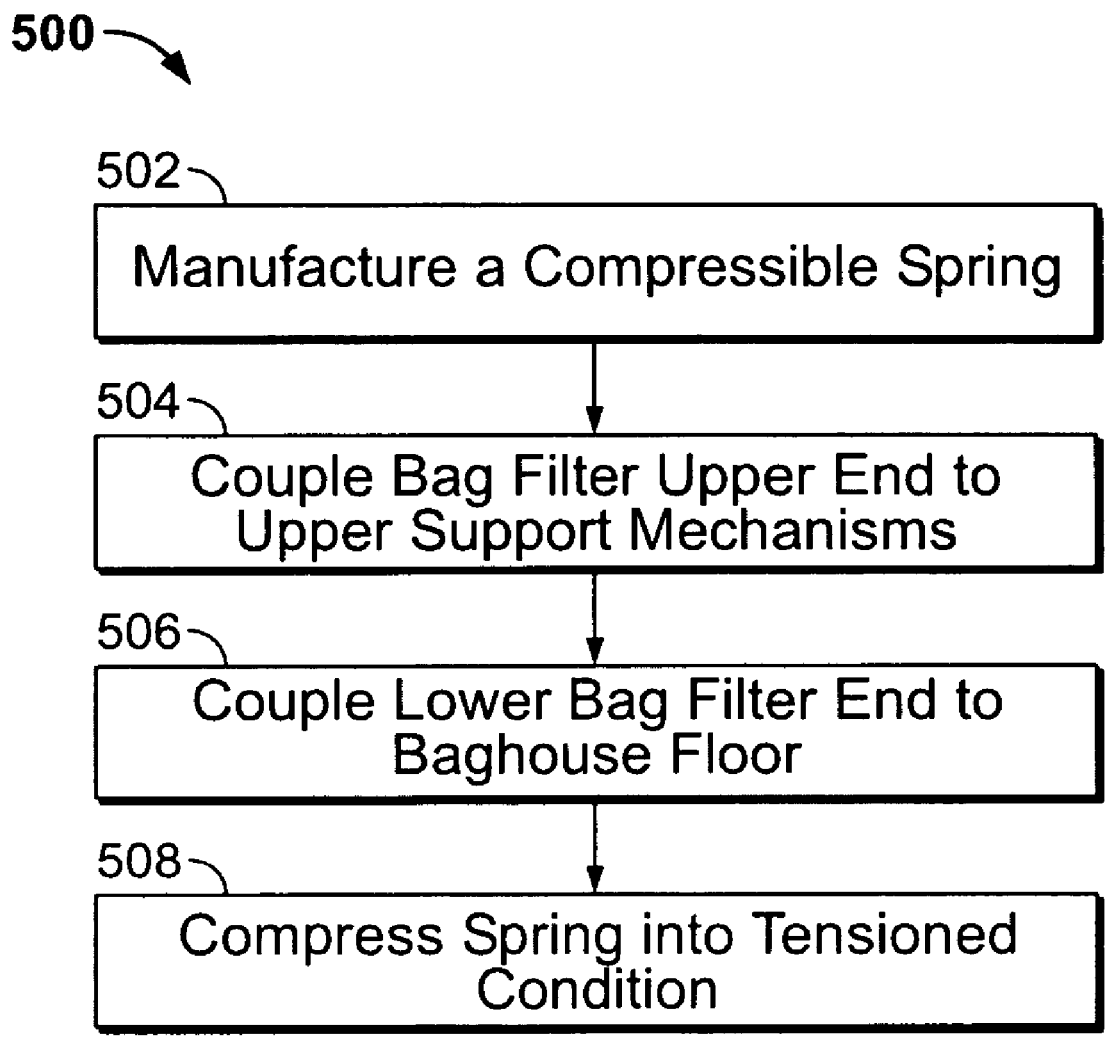
FIG. 10 is a flow chart for manufacturing and assembling an exemplary baghouse bag filter tensioning system that may be used with the system in FIG. 1.

FIG. 10 is flow chart 500 of an exemplary method for manufacturing and assembling an exemplary baghouse bag filter tensioning system (shown in FIGS. 4 and 5). Method 500 includes manufacturing 502 a compressible spring method step. Step 502 includes selecting a desired material. In the exemplary embodiment, spring 212 (shown in FIGS. 4 and 5) may be manufactured from 17-7Ph stainless steel wire with a 0.207-inch gauge thickness. Alternatively, chrome vanadium steel, chrome silicon steel, inconel, monel and titanium are further examples of materials that may be used. Cost and operational characteristics may be the prime determinants for selecting the material for use in spring manufacturing.

The pre-determined wire is inserted into a winding machine, which may include a lathe, to form a pre-determined number of coils with a pre-determined diameter and a pre-determined coil pitch. Excess wire may be removed via wire cutters, grinder or acetylene torch. Relieving the stresses induced in the spring due to the formation of the coils may be achieved through heat treating. For example, the 17-7 steel may be heated to approximately 482° C. (900° F.) for 60 minutes. Tensile strength of the spring may be increased through shot peening the spring. Shot peening is a method of cold working in which compressive stresses are induced in the exposed surface layers of the metallic spring by the impingement of a stream of shot, directed at the metal surface at high velocity under controlled conditions.

Manufacturing step 502 may be completed by removing any surface contaminations, including rust, with a passivation process in which spring 212 (shown in FIGS. 4 and 5) is first cleaned with an alkaline cleaning agent and subsequently inserted into an acid tank for a pre-determined period of time. Alkaline cleaning agents may include, but not be limited to, trisodium phosphate and sodium phosphate. Passivating acids may include, but not be limited to, muriatic acid, nitric acid and citric acid. Alternatively, mechanical polishing of spring 212 coils surfaces may be used to remove surface contamination. Examples of mechanical polishing activities may include, but not be limited to, abrading with aluminum oxide-based polishing sheets.

A method step 504 of exemplary method 500 includes coupling bag filter assembly 202 upper end to the upper support mechanisms. Referring to FIGS. 4 and 5, method step 504 includes coupling draw bar 226 to support chain 218 via inserting either draw bar ear 226c and associated draw bar leg 226a or draw bar ear 226d and associated draw bar leg 226b through a lowermost link of chain 218.

Method step 504 of exemplary method 500 further includes coupling spring 212 to draw bar 226 via inserting spring smaller diameter end 214 over chain 218 and draw bar 226 such that spring end 214 contacts draw bar ears 226c and 226d. Method step 504 also includes inserting washer 216 over chain 218 via washer central slot 217 to rest on top of spring larger diameter end 213.

Method step 504 of exemplary method 500 also includes coupling bag filter I-bolt 238 to draw bar 226 and spring 212 via inserting I-bolt 238 upward through center of spring 212 and draw bar 226 and inserting rolled pin 220 through uppermost I-bolt hole 238*a* such that pin 220 rests on the uppermost surface of retainer washer 216. Method step 504 further includes inserting chain 218 through support frame open passage 201*b* and inserting hitch pin clip 222 through a pre-determined chain link 224 such that spring 212 and draw bar 226 are temporarily positioned at a desired elevation in outlet plenum 130 (shown in FIG. 1). Method step 504 subsequently includes inserting S-hook 208 over lower hook end 238*b* of I-bolt 238 and inserting S-hook 208 through coupling ring 206 of bag filter assembly upper coupling cap 205.

Method step 504 may also be used with alternate embodiments as illustrated in FIGS. 6 and 7. Method step 504 of method 500 includes coupling bag filter assembly 302 upper end to the upper support mechanisms. Referring to FIGS. 6 and 7 method step 504 includes inserting spring 312 over a portion of double draw bar 326 such that draw bar ears 326*g* and 326*h* rest on smaller spring diameter end 314 and bight 326*m* protrudes through larger spring diameter 313. Subsequently, either ear 326*e* or 326*f* with associated arm 326*a* or 326*b*, respectively, are inserted through the lowermost link of chain 318 such that bight 326*k* rests within the lowermost link. Spring 312 with washer 316 are inserted through chain 318 such that larger spring diameter end 313 rests on washer 316 and washer 316 rests on draw arm ears 326*e* and 326*f*.

Method step 504 further includes inserting chain 318 through support frame open passage 301*b* and inserting hitch pin clip 322 through a pre-determined chain link 324 such that spring 312 and draw bar 326 are temporarily positioned at a desired elevation in outlet plenum 130 (shown in FIG. 1). Method step 504 subsequently includes inserting S-hook 308 over bight 326*m* and inserting S-hook 308 through coupling ring 306 of bag filter assembly upper coupling cap 305.

Method step 504 may further be used with alternate embodiments as illustrated in FIGS. 8 and 9. Method step 504 of method 500 includes coupling bag filter assembly 402 upper end to the upper support mechanisms. Method step 504 includes inserting I-bolt 418 through support frame open passage 401*b* such that hook 420 is temporarily positioned at a desired elevation in outlet plenum 130 (shown in FIG. 1), installing washer 416 over I-bolt 418 via central slot 417 such that washer 416 rests on the upper surface of angle iron 401*a*. Spring 412 is inserted over I-bolt 418 such that larger diameter end 413 rests on washer 416. Washer 422 is inserted over I-bolt 418 via central slot 423 such that the flat surface of washer 422 rests on spring smaller diameter end 414. Pin 424 is temporarily inserted through I-bolt hole 418*a* such that is rests on top of the domed portion of washer 422.

Method step 504 further includes inserting S-hook 408 over lower hook 420 of I-bolt 418 and inserting S-hook 408 through coupling ring 406 of bag filter assembly upper coupling cap 405.

A method step 506 of exemplary method 500 includes coupling the bottom cuff of bag filter tube 125 (shown in FIG. 1) to baghouse floor 108 (shown in FIG. 1) via lower mechanical coupling 120 (shown in FIG. 1). In the exemplary embodiment, coupling 120 includes a column-like upward floor protrusion (sometimes referred to as a thimble) (not shown in FIG. 1). The bottom of bag filter tube 125 slips over the thimble and is secured to the thimble via a clamping device similar in nature to a radiator hose clamp (not shown in FIG. 1). Alternate embodiments for coupling 120 may include a strap or a removable collar that is coupled to floor 108. Tube 125 is retainingly fastened to floor 108 such that bag filter interior cavity 124 (shown in FIG. 1) is in flow communication with inlet plenum 106 (shown in FIG. 1) via floor open passage 116 (shown in FIG. 1). Step 506 is substantially similar for the embodiments illustrated in FIGS. 4 and 5, FIGS. 6 and 7, and FIGS. 8 and 9.

A method step 508 of exemplary method 500 includes compressing spring 212 (shown in FIGS. 4 and 5) into a tensioned condition. Methods step 508 includes coupling the upper portion of chain 218, positioned above angle iron 201*a*, to a tensioning mechanism (not shown in FIGS. 4 and 5), temporarily removing pin 222 from chain link 224 and withdrawing chain 218 upward through open passage 201*b*. Examples of tensioning mechanisms may be, but not be limited to, electric, hydraulic and pneumatic motors coupled to a cable. Spring 212 compresses against retainer washer 216 and draw bar ears 226*c* and 226*d* to induce a force in spring 212 that tends to attempt to spread the first and second spring biasing surfaces apart from each other and, thus, to induce tension in fabric filter tube 204. A predetermined tension in tube 204 may be attained based on the distance of compression of spring 212. Upon attaining the predetermined spring height dimension, pin 222 may be reinserted through a link 224 of support chain 218. Step 508 is substantially similar for the embodiments illustrated in FIGS. 4 and 5, and FIGS. 6 and 7.

Method step 508 may also be used with alternate embodiments as illustrated in FIGS. 8 and 9. Method step 508 of method 500 includes coupling a tensioning mechanism (not shown in FIGS. 8 and 9) to the top of guide washer 422, and temporarily removing pin 424 from I-bolt 418. Examples of tensioning mechanisms may be, but not be limited to, hydraulic and pneumatic powered devices having at least one arm or foot that exerts a downward force on the domed top of guide washer 422. The tensioning mechanism induces a downward force on spring 412. Spring 412 compresses against cup washer 416 to induce a force in spring 412 that tends to attempt to spread the first and second spring biasing surfaces apart from each other and, thus, to induce tension in fabric filter tube 404. A predetermined tension in tube 404 may be attained based on the distance of compression of spring 412. Upon attaining the predetermined spring height dimension, pin 424 may be reinserted through hole 418*a* of I-bolt 418 and the tensioning mechanism removed.

The spring manufacturing and installation methods described herein facilitate operation of a baghouse filtering system. More specifically, manufacturing and installing a hybrid spring as described above facilitates operation of a baghouse filtering system in a plurality of operating modes by maintaining a substantially constant tension on a bag filter. Furthermore, the useful in-service life expectancy of the hybrid spring is substantially extended with the hybrid spring design. As a result, degradation of the bag filters when placed in service, increased maintenance costs and associated system outages may be reduced or eliminated.

Although the methods described and/or illustrated herein are described and/or illustrated with respect to manufacturing and installing a bag filter tensioning system, and more specifically, a hybrid bag filter spring, practice of the methods described and/or illustrated herein is not limited to bag filter springs nor to bag filter tensioning systems generally. Rather, the methods described and/or illustrated herein are applicable to manufacturing any article and installing in any system.

Exemplary embodiments of hybrid spring manufacturing and installation are described above in detail. The methods, apparatus and systems are not limited to the specific embodiments described herein nor to the specific springs manufactured and installed, but rather, the methods of manufacturing and installing hybrid springs may be utilized independently and separately from other methods, apparatus and systems described herein or to manufacturing and installing components not described herein. For example, other components can also be manufactured using the methods described herein.

While the invention has been described in terms of various specific embodiments, those skilled in the art will recognize that the invention can be practiced with modification within the spirit and scope of the claims.

What is claimed is:

1. A method of assembling a baghouse bag filter tensioning assembly, said method comprising:

providing a compressible spring including at least one straight spring portion and at least one conical spring portion, the at least one straight spring portion and the at least one conical spring portion are formed as a continuous spring member having a substantially constant gauge thickness, wherein the gauge thickness of the at least one straight spring portion is substantially equal to the gauge thickness of the at least one conical spring portion, the at least one straight spring portion having a substantially linear spring rate that induces a first tension in the bag filter during a filtration mode, and the at least one conical spring portion having a substantially progressively increasing spring rate that induces a second tension in the bag filter during a reverse flow mode;

coupling the spring to a bag filter support frame and a bag filter;

compressing the spring into a pretensioned condition;

coupling a bag filter to a baghouse floor; and decompressing the spring such that the first tension is induced in the bag filter, wherein the at least one straight spring portion is generally engaged during the filtration mode and the at least one conical spring portion is generally engaged during the reverse flow mode.

2. A method in accordance with claim 1 further comprising manufacturing a compressible spring by coiling a wire of a pre-determined material to a pre-determined coil diameter and pre-determined coil pitch using a winding apparatus, relieving residual stresses in the coiled wire, and removing surface impurities, wherein the winding apparatus is configured to coil the wire to form the spring with a plurality of pre-determined coil diameters.

3. A method in accordance with claim 1 wherein said compressing the spring into a pretensioned condition comprises compressing the spring between a set of first and second biasing surfaces and maintaining the pretensioned condition using a removable retainer.

4. A method in accordance with claim 1 wherein said coupling the spring to a bag filter support frame comprises extending the baghouse bag filter tensioning assembly through at least one bag filter support frame open passage.

5. A method in accordance with claim 3 wherein decompressing the spring comprises removing the retainer.

6. A baghouse filter system comprising:

a bag filter support frame comprising a structural support member wherein said member comprises at least one bag filter support frame open passage;

at least one bag filter assembly comprising a bag filter upper mechanical coupling device, a bag filter lower mechanical coupling device, an external surface, and an interior cavity comprising a fibrous material collection surface, wherein said collection surface collects materials with a plurality of pre-determined dimensions entrained in a fluid;

a bag filter tensioning assembly comprising at least one compressible spring and a plurality of coupling devices, wherein said spring is coupled to said bag filter via at least one of said coupling devices, said spring comprising at least one straight spring portion and at least one conical spring portion, said at least one straight spring portion and said at least one conical spring portion are formed as a continuous spring member having a substantially constant gauge thickness, wherein the gauge thickness of the at least one straight spring portion is substantially equal to the gauge thickness of the at least one conical spring portion, said at least one straight spring portion having a substantially linear spring rate that induces a first tension in said at least one bag filter assembly during a filtration mode, said at least one conical spring portion having a substantially progressively increasing spring rate that induces a second tension in said at least one bag filter assembly during a reverse flow mode, wherein said at least one straight spring portion is generally engaged during the filtration mode and said at least one conical spring portion is generally engaged during the reverse flow mode;

a plurality of chambers comprising an inlet plenum, an outlet plenum and a material collection hopper;

a baghouse floor comprising at least one bag house floor open passage and at least one bag filter-to-baghouse floor coupling device, and a reverse fluid flow sub-system.

7. A baghouse filter system in accordance with claim 6 wherein said at least one of bag filter support frame open passage is configured to receive at least a portion of said bag filter tensioning assembly.

8. A baghouse filter system in accordance with claim 6 wherein said bag filter tensioning assembly further comprises a plurality of biasing surfaces and a removable retainer configured to retain said spring in a compressed state.

9. A baghouse filter system in accordance with claim 8 wherein said removable retainer comprises a pin member positioned adjacent to one of said biasing surfaces.

10. A baghouse filter system in accordance with claim 6 wherein said spring is sized to receive at least a portion of said plurality of coupling devices therein.

11. A baghouse filter system in accordance with claim 6 wherein said floor substantially separates said inlet plenum from said outlet plenum.

12. A baghouse filter system in accordance with claim 6 wherein said inlet plenum is flow connected to an inlet duct.

13. A baghouse filter system in accordance with claim 6 wherein said outlet plenum is flow connected to an outlet duct.

14. A baghouse filter system in accordance with claim 6 wherein said bag filter is fixedly coupled to said baghouse floor such that said interior cavity of said bag filter is in flow communication with said inlet plenum via said baghouse filter system floor open passage.

15. A baghouse filter system in accordance with claim 6 wherein said bag filter is positioned within said outlet plenum such that said external surface is in flow communication with said outlet plenum such that fluid flow from said outlet plenum to bag interior cavity through said external surface is facilitated via said reverse fluid flow sub-system and said spring, thereby facilitating bag filter cleaning.

* * * * *